United States Patent [19]
Van Erden et al.

[11] Patent Number: 5,695,709
[45] Date of Patent: Dec. 9, 1997

[54] METHOD AND APPARATUS FOR PRODUCING HIGHLY ORIENTED POLYESTER SHEET

[75] Inventors: Donald L. Van Erden, Wildwood; Manuel C. Enriquez, Morton Grove, both of Ill.

[73] Assignee: Signode Corporation, Glenview, Ill.

[21] Appl. No.: 485,538

[22] Filed: Jun. 7, 1995

Related U.S. Application Data

[63] Continuation-in-part of Ser. No. 353,721, Dec. 12, 1994, Pat. No. 5,525,287, which is a continuation-in-part of Ser. No. 958,803, Oct. 9, 1992, Pat. No. 5,387,388.

[51] Int. Cl.⁶ .................... B29C 35/10; B29C 43/22; B29C 47/00
[52] U.S. Cl. .................... 264/476; 264/130; 264/177.16; 264/177.17; 264/177.19; 264/210.7; 264/280; 264/288.4; 264/481; 425/90; 425/174.4; 425/335; 425/363; 425/377; 425/378.1; 425/383; 425/403; 425/403.1
[58] Field of Search ........................ 264/130, 177.16, 264/177.17, 177.19, 210.7, 280, 288.4, 476, 481; 425/90, 174.4, 335, 363, 377, 378.1, 383, 403, 403.1

[56] References Cited

U.S. PATENT DOCUMENTS

| | | |
|---|---|---|
| 2,326,927 | 8/1943 | Conrad . |
| 2,471,392 | 5/1949 | Campbell . |
| 3,083,410 | 4/1963 | McGlamery . |
| 3,290,420 | 12/1966 | Orser . |
| 3,351,697 | 11/1967 | Hufnagel et al. . |
| 3,354,023 | 11/1967 | Dunnington et al. . |
| 3,394,045 | 7/1968 | Gould . |
| 3,499,957 | 3/1970 | Ancker . |
| 3,619,460 | 11/1971 | Chill . |
| 3,651,196 | 3/1972 | Starkweather, Jr. . |
| 3,741,702 | 6/1973 | Mazzoni . |
| 3,761,217 | 9/1973 | Mambretti . |
| 3,800,008 | 3/1974 | Starkweather, Jr. . |
| 3,956,517 | 5/1976 | Curry et al. . |
| 4,022,863 | 5/1977 | Karass et al. . |
| 4,038,012 | 7/1977 | Sander . |
| 4,117,054 | 9/1978 | Salo . |
| 4,118,454 | 10/1978 | Miki et al. . |
| 4,152,475 | 5/1979 | Haley . |
| 4,311,658 | 1/1982 | Nicoll . |
| 4,408,974 | 10/1983 | Comerio . |
| 4,428,720 | 1/1984 | Van Erden et al. . |
| 4,495,124 | 1/1985 | Van Erden et al. . |
| 4,503,007 | 3/1985 | Matsumoto . |
| 4,596,523 | 6/1986 | Whitehead . |
| 4,643,865 | 2/1987 | Okada et al. . |
| 4,681,723 | 7/1987 | Jester . |
| 4,849,234 | 7/1989 | Spinelli et al. . |
| 5,049,347 | 9/1991 | Magill et al. . |
| 5,137,661 | 8/1992 | Kanome et al. . |

FOREIGN PATENT DOCUMENTS

| 1478576 | 7/1977 | United Kingdom . |
|---|---|---|

OTHER PUBLICATIONS

Principles of Polymer Processing, Tadmor and Gogos, pp. 363–372; 442–447; 661–663 (1979).

*Primary Examiner*—Leo B. Tentoni
*Attorney, Agent, or Firm*—Schwartz & Weinrieb

[57] ABSTRACT

A method and apparatus for producing highly-oriented polyester sheet comprises a two-stage drawing process. The first drawing stage is performed within a zero-gap milling and stretching roller assembly comprising a pair of opposed rollers defining a nip therebetween and wherein the rollers are rotated in opposite directions at different lineal surface velocities such that a predetermined draw ratio is defined therebetween. Amorphous polyester sheet is conducted through the nip of the opposed rollers, and as a result of the simultaneous milling and stretching of the polyester sheet, the amorphous polyester is transformed into crystalline polyester as a result of orientation-induced crystallization. The crystalline polyester sheet is heated above the glass transition temperature ($T_g$) immediately downstream of the nip defined between the pair of opposed rollers, and an exit bridle assembly is disposed downstream of the pair of opposed rollers. The rollers of the bridle assembly are rotated at lineal surface velocities which are greater than the lineal surface velocity of the downstream one of the pair of opposed rollers such that a second draw ratio is defined with respect to such downstream one of the pair of opposed rollers. The heating of the crystalline polyester sheet facilitates the additional stretching thereof within the second drawing stage of the apparatus, the overall drawing ratio being approximately 6:1. Highly oriented polyester, having tensile strength values of approximately 100,000 psi, and modulus values of approximately 3,000,000–5,000,000, is achieved.

22 Claims, 4 Drawing Sheets

METHOD AND APPARATUS FOR PRODUCING HIGHLY ORIENTED POLYESTER SHEET

CROSS-REFERENCE TO RELATED PATENT APPLICATIONS

This patent application is a Continuation-In-Part (CIP) patent application of U.S. patent application Ser. No. 08/353,721 filed on Dec. 12, 1994 by Donald L. Van Erden et al. and entitled METHOD AND APPARATUS FOR PRODUCING ORIENTED PLASTIC STRAP, AND STRAP PRODUCED THEREBY and now U.S. Pat. No. 5,525,287 which issued on Jun. 11, 1996, which, in turn, is a Continuation-In-Part (CIP) patent application of U.S. patent application Ser. No. 07/958,803 filed on Oct. 9, 1992 by Donald L. Van Erden et al. and entitled METHOD AND APPARATUS FOR PRODUCING ORIENTED PLASTIC STRAP, now U.S. Pat. No. 5,387,388.

FIELD OF THE INVENTION

The present invention relates generally to a method and apparatus for producing an oriented plastic sheet, and more particularly to a method and apparatus for producing a highly oriented polyester sheet which exhibits enhanced tensile strength and modulus characteristics, parameters, or values.

BACKGROUND OF THE INVENTION

In accordance with a typical prior art stretching process, such as, for example, the SIGNODE process, a cast sheet of thermoplastic material, such as, for example, polypropylene, is first reduced in size, that is, the thickness dimension thereof, by rolling the sheet through a pair of closely spaced milling rollers or cylinders which rotate in opposite directions. After the thickness of the sheet has been reduced, the sheet is then drawn and stretched out from the milling rollers by means of a series of orienting rollers or a bridle assembly so as to achieve its finalized desired size or thickness.

Another prior art process or method that is commonly used in connection with the fabrication of stretched sheet materials is a process known as or called the short-gap method and is generally comprised of an entry bridle, a stretching assembly, and an exit bridle. In accordance with this process, a slow speed, heated entry bridle assembly advances a cast sheet of material, usually film, to a stretching assembly which comprises a pair of rollers or cylinders which are set a predetermined distance apart. The first roller rotates at the same speed as that of the entry bridle, whereas the second roller rotates at a speed which is greater than that of the first roller and which is equal to the rotary speed of the exit bridle. Thus, as the film passes through the entire assembly, it is stretched to its finalized desired size or thickness dimension.

These prior art methods or processes have presented several disadvantages. For example, the properties of the straps produced by these methods or processes provide or exhibit limited increases in strength without significant decreases in other desired properties. In addition, substantial necking of the sheets occur as the sheets are stretched over the distance or space defined between the rollers.

U.S. patent application Ser. No. 07/958,803, now U.S. Pat. No. 5,387,388, disclosed a novel process and apparatus for achieving the simultaneous milling and stretching of such sheets whereby the aforenoted problems were minimized, however, other operational problems with such process and apparatus were discovered which likewise required rectification in order to achieve simultaneously milled and stretched sheets of thermoplastic material which exhibited other desirable properties. For example, one operational problem or deficiency which was discovered in connection with the fabrication or manufacture of the simultaneously milled and stretched sheets of thermoplastic material in accordance with the zero-gap process and apparatus set forth and described within U.S. Pat. No. 5,387,388 is that when the thermoplastic sheet is ready to be worked, that is, simultaneously milled and stretched, by being conducted through the nip defined between the oppositely rotating rollers of the zero-gap assembly, it was found that the opposite surfaces of the thermoplastic sheet exhibited different surface temperature values. The reason for this is that as the thermoplastic sheet is routed about the first or upstream roller of the zero-gap roller assembly, the inside surface of the thermoplastic sheet, that is, the surface of the sheet which is disposed in direct contact with the first or upstream roller of the roller assembly, will be heated by the first or upstream roller, or at least have its surface effectively prevented from being cooled by the ambient air because such surface is disposed in direct contact with the first or upstream roller and not exposed directly to the ambient air. On the contrary, the outer or exterior surface of the thermoplastic sheet, that is, the surface of the sheet which is not disposed in direct contact with the first or upstream roller, is effectively cooled as a result of being exposed to the ambient air. Such temperature differential between the aforenoted surfaces of the thermoplastic sheet leads to density differentials throughout the thermoplastic sheet which adversely affects the various properties of the processed sheet, such as, for example, the tensile strength, weldability and associated properties, and split resistance.

Another problem or deficiency which was discovered in connection with the aforenoted zero-gap simultaneous milling and stretching apparatus and method was that as a result of the processing of the thermoplastic sheet, the opposite edge portions of the sheet became thickened, or in other words, the sheet did not exhibit a uniform thickness or flatness profile across the width thereof. Consequently, when the processed sheet was to be subsequently processed into thermoplastic strapping, the thickened edge portions could not be used to fabricate such straps unless further processing was performed upon the sheet so as to effectively reduce the thickness dimensions of the edge portions of the sheet to desired thickness dimensions characteristic of useable strapping.

Accordingly, the invention embodied and disclosed within U.S. patent application Ser. No. 08/352,721 was directed toward an apparatus and method for producing an oriented thermoplastic strap was which simultaneously milled and stretched as a result of a thermoplastic sheet workpiece being passed through a nip defined between the oppositely rotating rollers of the zero-gap assembly, and wherein further, in order to overcome the aforenoted deficiencies of the zero-gap simultaneous milling and stretching apparatus and method with respect to the density differentials and thickened edge portions of the milled and stretched sheet, various heating techniques were employed in connection with the milled and stretched sheet, as more particularly disclosed within the aforenoted patent application Ser. No. 08/352,721, which disclosure is hereby incorporated herein by reference, whereby the aforenoted deficiencies were overcome.

Additional studies and analysis of the existing zero-gap technology as noted hereinabove, as disclosed and described within both U.S. Pat. No. 5,387,388 and U.S. patent application Ser. No. 08/353,721, now U.S. Pat. No. 5,525,287, have revealed, however, that when such technology is applied or utilized in connection with the fabrication or manufacture of polyester sheets or straps, particularly in connection with the fabrication or manufacture of such sheets or straps from polyethylene terephthalate, the resulting sheets or straps do not exhibit high tensile strength and high modulus characteristics, parameters, or values.

A need therefore exists for the development of apparatus, and a concomitant method, for producing highly oriented polyester sheets or straps wherein the apparatus, and the concomitant method, employs special or unique orientation, stretching, or drawing techniques in conjunction with special or unique heating techniques whereby the produced or manufactured polyester sheets or straps exhibit enhanced tensile strength and modulus values, characteristics, or parameters.

OBJECTS OF THE INVENTION

Accordingly, it is an object of the present invention to provide a new and improved method and apparatus for producing highly oriented polyester sheets or straps.

Another object of the present invention is to provide a new and improved method and apparatus for producing highly oriented polyester straps or sheets which overcomes the various deficiencies, drawbacks, disadvantages, and problems of the prior art processes and apparatus.

Yet another object of the present invention is to provide a new and improved method and apparatus for producing highly oriented polyester sheets or straps which is capable of producing such straps or sheets by simultaneously milling and stretching sheet workpieces into such straps or sheets, having a predetermined thickness dimension, as a result of the sheet workpieces being conducted in a single pass through a nip defined between a pair of zero-gap rollers.

Still another object of the present invention is to provide a new and improved method and apparatus for producing highly oriented polyester sheets or straps wherein the sheets or straps produced thereby exhibit significantly higher tensile strength and modulus values when compared to straps or sheets produced by heretofore known prior art methods and apparatus.

A further object of the present invention is to provide a new and improved method and apparatus for producing highly oriented polyester sheets or straps wherein improved uniform thickness and flatness characteristics are imparted to the finalized milled and stretched strap or sheet as a result of various heating, rolling, and extrusion techniques being imparted to the original sheet workpiece or material.

SUMMARY OF THE INVENTION

Briefly, the foregoing and other objects are achieved in accordance with the present invention through the provision of a method and apparatus for producing highly oriented polyester sheets or straps which will have a predetermined desired thickness for use in strapping packages and the like, wherein the strap, having the noted predetermined desired thickness, is simultaneously milled and stretched as a result of a polyester sheet workpiece being passed through a nip defined between a pair of rollers or cylinders which are spaced closely together with respect to each other. The nip has a space dimension which is substantially less than the original thickness dimension of the sheet workpiece, and the rollers are rotated in opposite directions and at substantially different lineal surface velocities.

In order to improve the various properties of the simultaneously milled and stretched strap, that is, for example, the tensile strength and modulus or stiffness of the fabricated oriented sheets or straps, the solid sheet or strap, in accordance with the teachings of the present invention, is subjected to a unique orientation sequence and a unique heating sequence. In particular, the orientation sequence is, in effect, a two-stage drawing sequence wherein the first drawing operation is effectively performed within the zero-gap roller assembly, while the second drawing operation is performed by means of an exit bridle assembly in cooperation with the downstream roller of the zero-gap roller assembly. Concomitantly therewith, the heating sequence comprises a predetermined mode of heating, for example, the upstream and downstream rollers of the zero-gap roller assembly, which indirectly heat the solid polyester sheet or strap, as well as directly heating the solid polyester strap or sheet at a particular location with respect to the upstream roller of the zero-gap roller assembly so as to accurately and consistently control and predetermine the orientation of the polyester sheet or strap. In addition, the mechanical work imparted to or impressed upon the polyester sheet or strap as the same is conducted through the nip of the rollers of the zero-gap roller assembly also contributes to additional heating of the strap or sheet so as to facilitate the stretching of the sheet or strap and the resulting orientation thereof.

In order to improve the flatness of the resultant simultaneously milled and stretched polyester sheet such that an increased volume of strapping can be produced from such sheeting, thinner edge portions can be initially imparted to the polyester sheet workpiece either upstream of or prior to entry of the sheet workpiece into the nip defined between the zero-gap milling rollers, or within the nip defined between the zero-gap milling rollers. In view of the tendency of the edge portions of the workpiece to become thickened as a result of the simultaneous milling and stretching of the sheet workpiece within the zero-gap roller assembly, the resulting edge portions, in accordance with the processing techniques of the present invention, will exhibit thickness dimensions which will be commensurate with the thickness dimension of the central portion of the sheet workpiece, as viewed transversely across the width of the sheet workpiece, when the sheet workpiece is simultaneously milled and stretched. Production of the thinner edge portions of the sheet workpiece can be produced, for example, by means of specially contoured milling rollers employed within the zero-gap roller assembly defining the nip through which the sheet workpiece is forced to pass, the zero-gap milling rollers effectively defining a nip therebetween which has a trapezoidal cross-sectional configuration. In a similar but alternative manner, and in accordance with a second means or mode for producing such thinner edge portions upon the resulting workpiece, specially contoured extrusion dies and casting rollers can be employed so as to similarly provide the extruded and cast sheet workpiece with a substantially trapezoidal configuration such that the edge portions of the sheet workpiece are tapered. As a result of the simultaneous milling and stretching of the sheet workpiece, the tapered edge portions thereof will experience increased thickening whereby, as a result, the thickness dimensions of the edge portions will become similar to the thickness dimension of the central portion of the sheet workpiece.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
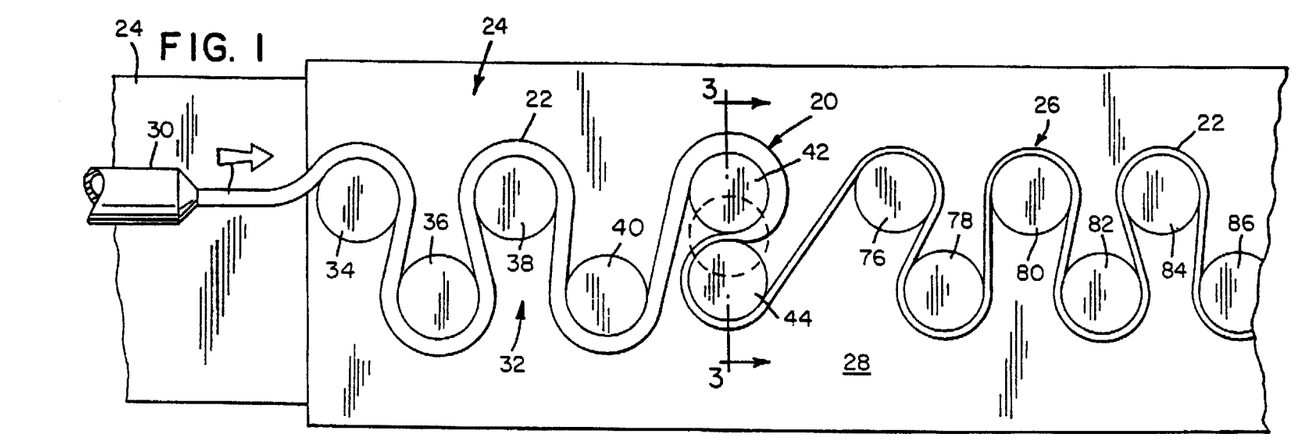
FIG. 1 is a fragmentary, front view of apparatus, constructed in accordance with the present invention, for producing oriented plastic strap in accordance with the zero-gap manufacturing process or techniques of the present invention.

Referring now to the drawings, and more particularly to FIG. 1 thereof, there is schematically illustrated a zero-gap roller assembly, generally indicated by the reference character 20, for simultaneously milling and stretching or elongating a sheet workpiece 22 into a thin strap stock material. The present invention is discussed and illustrated with only a single sheet workpiece 22 being conducted through the assembly 20, however, it is to be understood that more than one sheet or workpiece 22 may be simultaneously passed through the assembly 20. It is to be further understood that the phrase or terminology "zero-gap" as will be used throughout this patent specification refers to the concept of substantially eliminating any gap between the step of milling the sheet workpiece and the step of stretching or elongating the sheet workpiece. Considered in an alternative manner, the steps of milling and stretching or elongating of the sheet workpiece are accomplished substantially simultaneously. In addition, it is noted, as disclosed in FIG. 1, that the zero-gap assembly 20 is located between a sheet or workpiece feeding assembly 24 and an exit bridle assembly 26 which are located or mounted upon a frame or support 28.

Figure 5:
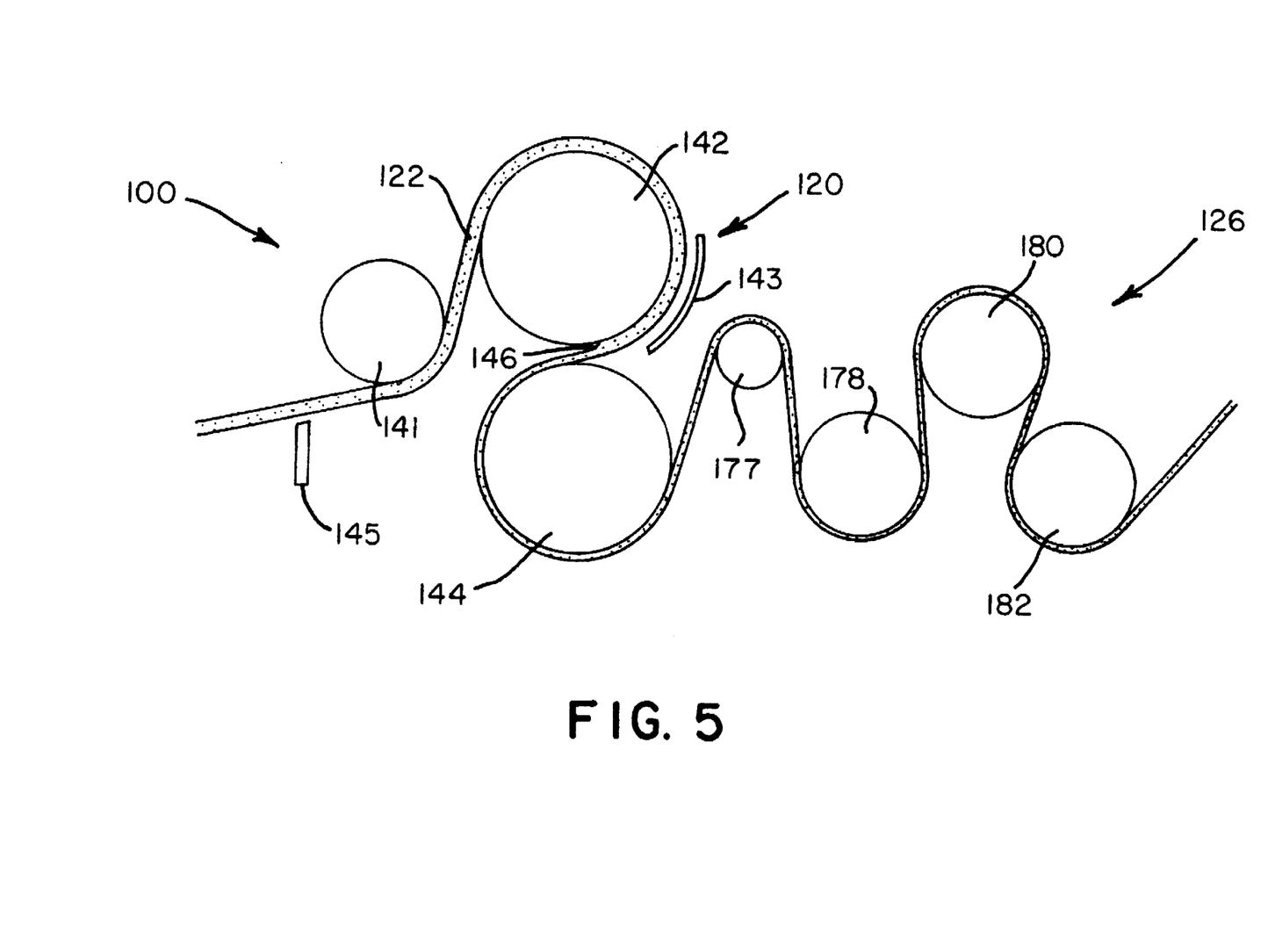
FIG. 5 is a schematic view, similar to that of FIG. 1, disclosing the milling and stretching apparatus or system construction accordance with the principles or teachings of the present invention for producing highly-oriented polyester sheets or strapping.
Figure 6:
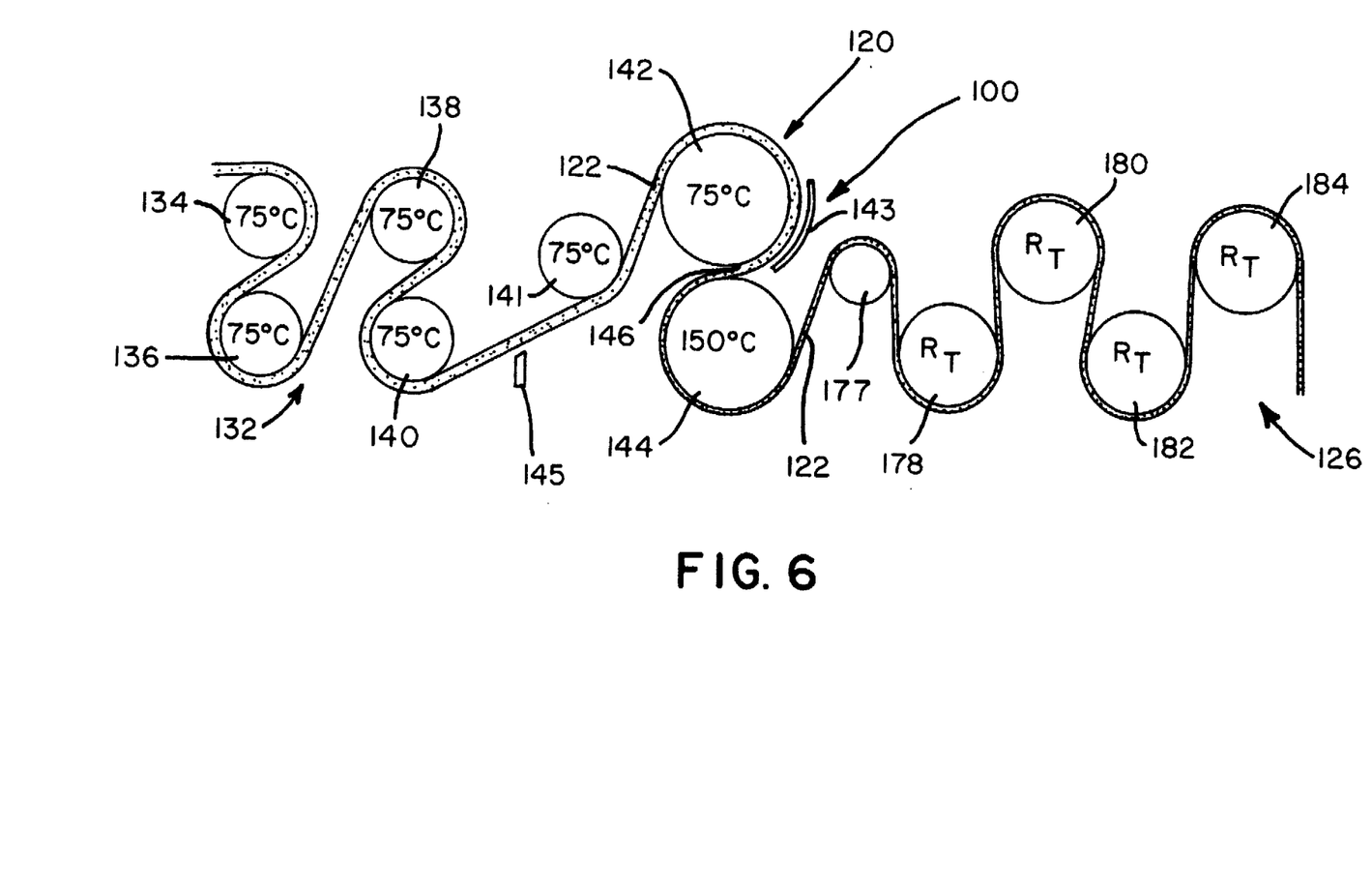
FIG. 6 is a schematic view, similar to that of FIG. 5, disclosing or illustrating the particularly unique heating scheme or sequence developed in accordance with the principles or teachings of the present invention and as utilized or incorporated within the entry bridle, zero-gap mill roll, and exit bridle roller assemblies of the present invention so as to facilitate production of highly-oriented polyester sheets or strapping.

The feeding assembly 24 may take any one of several forms, and as shown in FIG. 1, comprises an extruding machine 30 for extruding a sheet or workpiece 22 of stock material, and an entry bridle assembly 32. The extruding machine 30 produces a sheet workpiece 22 from a suitable material, such as, for example, polypropylene, a polyester, such as, for example, polyethylene terephthalate (PET), or the like, and the sheet workpiece 22 is conducted into the entry bridle assembly 32 which, in turn, feeds the sheet workpiece into the zero-gap roller assembly 20. The sheet workpiece 22 may be heated during its passage through the entry bridle assembly 32 so as to in effect be pre-heated upon entry into the zero-gap roller assembly 20 in order to enhance the working properties, stretching or elongating, and orientation properties and resulting characteristics of the material comprising the sheet workpiece 22, and this heating technique will be more fully discussed in connection with the fabrication of highly-oriented polyester sheeting or strapping when the system or apparatus of FIGS. 5 and 6 is discussed hereinafter.

The entry bridle assembly 32 is seen to comprise a plurality of rollers or cylinders 34, 36, 38, and 40 which are mounted by suitable means, such as, for example, shafts, not shown, upon the frame or support 28. The rollers 34, 36, 38, and 40 may be either solid or hollow, and in the preferred embodiment, as illustrated in FIG. 1, the rollers 34, 36, 38, and 40 are essentially only used to properly deliver or feed the sheet workpiece 22 into the zero-gap assembly 20, and they do not substantially contribute to any stretching or milling of the sheet workpiece 22. A different number of rollers may be employed than that shown in FIG. 1, and it is seen that rollers 34, 36, 38, and 40 are arranged within two vertically spaced rows with the bottom row rollers 36 and 40 being located between or offset with respect to the top row rollers 34 and 38. Rollers 34 and 38 are also mounted for rotation in the clockwise direction while rollers 36 and 40 are mounted for rotation in the counterclockwise direction, whereby when the sheet workpiece 22 is wound around or routed through the entry bridle assembly 32, it travels through the rollers 34, 36, 38, and 40 in the proper mode or direction with respect to the directions of rotation of the rollers 34, 36, 38, and 40. Each one of the rollers 34, 36, 38, and 40 is rotated at a uniform speed by suitable means, not shown, such as, for example, a motor and shaft drive assembly, and all of the rollers 34, 36, 38, and 40 rotate at substantially the same speed or lineal surface velocity as the top roller 42 of the zero-gap assembly 20, which will be discussed in greater detail hereinafter.

Continuing further, after the sheet workpiece 22 passes through the feeding assembly 24, it advances toward the zero-gap assembly 20 for simultaneous milling and stretching into a finished sheet 22 which has a predetermined desired thickness. The zero-gap assembly 20 comprises a pair of rollers or cylinders 42 and 44 that are rotatably mounted in an opposing relationship. The nip 46, that is, the distance defined between the rollers 42 and 44, can be substantially varied depending upon the desired finished thickness of the finished sheet 22. The zero-gap rollers 42 and 44 may either be solid or hollow, and may be heated by any well-known means, not shown, such as, for example, circulating a heated fluid through the rollers 42 and 44, in order to enhance the stretching properties of the sheet material. The zero-gap rollers 42 and 44 may also be flat, as shown in FIGS. 1–4, or may be contoured as will be illustrated and described more particularly hereinafter in order to change the shape of the sheet workpiece 22 as it passes through the rollers 42 and 44 of the zero-gap assembly 20 and provide the finalized sheet workpiece product with predetermined thickness profile characteristics.

Figure 2:
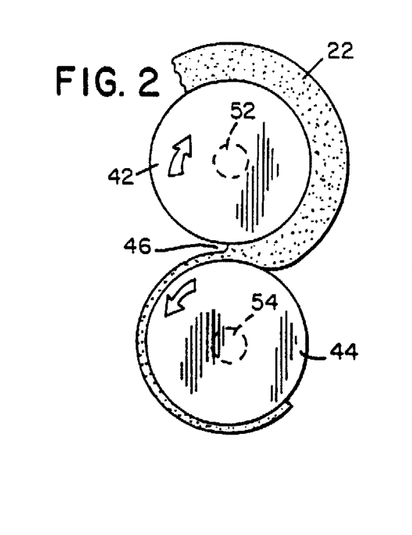
FIG. 2 is an enlarged, simplified, fragmentary front view of the milling and stretching rollers defining or comprising the zero-gap roller assembly of FIG. 1.
Figure 3:
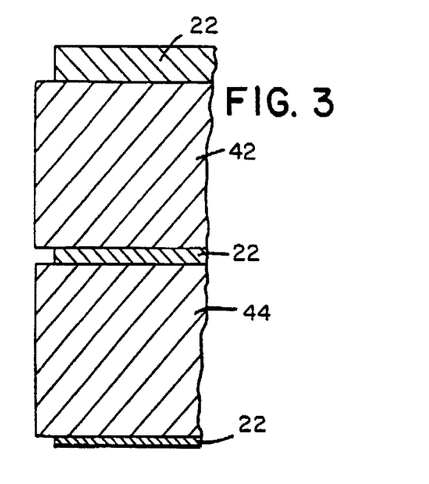
FIG. 3 is an enlarged, partial, cross-sectional view of the milling and stretching rollers defining the zero-gap roller assembly of FIG. 1 as taken along the line 3—3 of FIG. 1.

As best shown in FIG. 2, the upper roller 42 of the zero-gap roller assembly 20 is driven in the clockwise direction, as is shown by means of its associated arrow, while the bottom or lower roller 44 of the assembly 20 is driven in the counterclockwise direction as similarly shown or designated by means of its associated arrow. Thus, the sheet workpiece 22 is first routed around a major circumferential portion of the top or upper milling roller 42, the workpiece 22 is then conducted through the nip 46 defined between the milling rollers 42 and 44, and is then conducted around a major circumferential portion of the bottom or lower roller 44. More particularly, it is to be appreciated that the sheet workpiece 22 is disposed in surface contact with each one of the zero-gap assembly rollers 42 and 44 over a circumferential extent which is greater than one-half of each one of the circumferential extents of each one of the rollers 42 and 44, and it is further noted that as a result of this particular routing of the sheet workpiece 22 through the nip 46 defined between the zero-gap milling rollers 42 and 44, and about the outer circumferential or peripheral surfaces of the rollers 42 and 44, each roller 42 and 44 is disposed in contact with an opposite surface or side of the sheet workpiece 22.

In accordance with the illustrated zero-gap roller assembly embodiment of the present invention, as shown in FIGS. 1–4 and as has been described in detail in conjunction with such drawing figures, the milling and stretching rollers 42 and 44 of the zero-gap roller assembly 20 are disposed in a top-bottom or upper-lower arrangement with respect to each other, however, it is to be appreciated that the rollers 42 and 44 may alternatively be disposed in a side-by-side arrangement in which case the top or upper roller 42 will be disposed toward the left of the bottom or lower roller 44 such that the roller 42 will be the first or upstream roller that the sheet workpiece 22 contacts or encounters, while the bottom or lower roller 44, which is now, in effect, the right roller, will be the second or downstream roller that the sheet workpiece 22 will contact or encounter. As best seen in FIG. 2, the rollers 42 and 44 are respectively mounted upon rotary shafts or axles 52 and 54.

Figure 4:
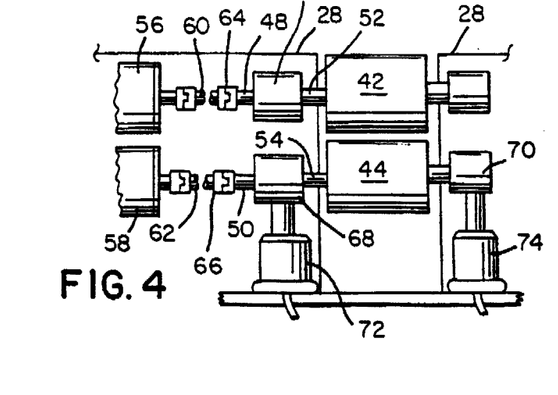
FIG. 4 is a simplified, fragmentary, cross-sectional view, on a reduced scale, of the milling and stretching rollers defining the zero-gap roller assembly of FIG. 1, as taken along a line or direction parallel to line 3—3 of FIG. 1.

With particular reference now being made to FIG. 4, the drive system for the rollers 42 and 44 is disclosed therein, and it is seen that the axles or shafts 52 and 54 of the rollers 42 and 44 are operatively connected, through means of bearings 69 and 68, to driven shafts 48 and 50. Suitable drive means 56 and 58, such as, for example, electric motors, are mounted upon the support 28 and drive the rollers 42 and 44, respectively, through means of drive shafts 60 and 62 which are connected to the shafts 48 and 50 by means of suitable couplings 64 and 66, coupling 66 preferably comprising a universal coupling for reasons to become apparent shortly. The bottom or lower roller 44 is connected to the support 28 through means of bearings 68 and 70, and the coupling 66, and bearings 68 and 70, permit the bottom or lower roller 44 to move with respect to the support 28 by means of actuators 72 and 74. In this manner, the bottom or lower roller 44 is able to be moved toward or away from the stationary top or upper roller 42 so as to desirably change the size of nip 46 defined between the rollers 42 and 44. Each one of the driven shafts 48 and 50 is independently driven by its separate drive means 56 and 58, and the bottom or lower roller 44 is driven at a speed greater than that of the top or upper roller 42. In particular, in accordance with the teachings of the present invention, the lower or bottom roller 44 is driven in such a manner that its lineal surface velocity is preferably within the range of seven to twelve (7–12) times greater than the lineal surface velocity of the top or upper roller 42 when, for example, the sheet workpiece 22 being processed comprises polypropylene. However, as will be more fully explained and disclosed hereinafter, when the sheet workpiece 22 being processed is polyester, such as, for example, and preferably, polyethylene terephthalate (PET), the lineal surface velocity or draw ratio of the lower or bottom roller 44 is within the range of four to five (4–5) times greater than the lineal surface velocity of the top or upper roller 42.

In view of the foregoing, it can be appreciated that as the sheet workpiece 22 is passed through the nip 46 defined between the upper and lower rollers 42 and 44 of the zero-gap roller assembly 20, the top or upper roller 44 effectively operates as a brake, and the mill reduction operation per se may also effectively operate as a brake, upon the lower surface of the sheet workpiece 22, that is, the surface disposed in contact with the upper roller 42, while the bottom or lower roller 44 pulls and accelerates the sheet workpiece 22, the roller 44 effectively operating upon the upper surface of the sheet workpiece 22, that is, the surface thereof which is disposed in contact with the roller 44. As the sheet workpiece accelerates through the nip 46 defined between the rollers 42 and 44, it is simultaneously milled and stretched to its final predetermined thickness which may in fact be less than the space dimension of the nip 46 as defined between the rollers 42 and 44. In particular, the thickness of the finished sheet 22 depends upon the lineal surface velocity differential or draw ratio defined between the top roller 42 and the bottom roller 44, that is, the faster the bottom or lower roller 44 rotates relative to the top or upper roller 42, the thinner the finished sheet 22 will be. It is also to be noted that some stretching may occur slightly before or slightly after the nip 46 defined between the pair of rollers 42 and 44 depending, again, upon the surface velocity differential defined between the rollers 42 and 44. Thus, as has been noted hereinabove, there is essentially a zero gap, space, or time frame between the milling and stretching functions or operations performed in connection with the sheet workpiece 22 and the processing thereof into the finalized or finished sheet 22. As a result of such simultaneous milling and stretching processing, it has been noted that there is substantially less necking of the sheet width as compared to the parameters of sheets which have undergone stretching or drawing processing in accordance with prior art processes or techniques wherein the sheet is stretched only after the milling step has been performed and completed.

After the finished sheet 22 exits from the zero-gap roller assembly 20, it is conducted through the exit bridle assembly 26. The exit bridle assembly 26 may take any one of several different forms, and as shown in FIG. 1, the assembly preferably comprises a plurality of rollers or cylinders 76, 78, 80, 82, 84, and 86 which are mounted by suitable means, such as, for example, shafts or axles, not shown, upon the support 28. The assembly 26, and in particular, the rollers 76–86, are used to pull the finished sheet 22 out from the zero-gap assembly 20. The rollers 76, 78, 80, 82, 84, and 86 may be solid or hollow, and more or fewer rollers than those disclosed may be used. The rollers 76, 78, 80, 82, 84, and 86 do not, in this embodiment, substantially contribute to any stretching of the finished sheet 22, however, as will become apparent hereinafter, when the system of FIG. 1 is modified so as to fabricate highly-oriented polyester sheets, the rollers of the exit bridle assembly of such modified apparatus or system will perform a critically important stretching, elongating, or drawing function in connection with the fabrication of such polyester sheets so as to achieve polyester sheets which exhibit desired high tensile strength and modulus parameters. Referring back to the embodiment of FIG. 1, it is seen that the rollers 76, 78, 80, 82, 84, and 86 are arranged in two vertically spaced rows with the bottom or lower row rollers 78, 82, and 86 also being spaced between the top or upper row rollers 76, 80, and 84 as considered in the transverse direction. The upper rollers 76, 80, and 84 all rotate in the clockwise direction, while the lower rollers 78, 82, and 86 all rotate in the counterclockwise direction such that the finished sheet 22 can be properly conducted through the exit bridle assembly 26. The rollers 76, 78, 80, 82, 84, and 86 are rotated at a uniform rate of speed by suitable drive means, not shown, such as, for example, a motor and shaft assembly, and the speed of the rollers 76, 78, 80, 82, 84, and 86 is such that, in accordance with this embodiment of the present invention, the lineal surface velocities thereof are essentially the same as that of the bottom or lower roller 44 of the zero-gap roller assembly 20.

It is to be appreciated that in accordance with further teachings of the present invention, another stretching process, and apparatus for implementing the same, such as, for example, a short gap stretching apparatus, system, or assembly, may be used either before or after the zero-gap assembly 20 so as to further modify or enhance the characteristics of the finished sheet 22, and as has been alluded to hereinbefore, such an additional apparatus or system, and the concomitant stretching techniques thereof, will be more fully disclosed hereinafter with respect to the special processing or fabrication of highly oriented polyester sheets.

Having now disclosed the specifics of the apparatus comprising the first embodiment of the present invention, the method to be practiced by means of such apparatus and in accordance with the present invention will now be described. More particularly, the sheet workpiece 22 is fed from the extruding machine 30 to the entry bridle assembly 32 and is wound around the entry bridle assembly rollers 34, 36, 38, and 40 so as to be, in turn, properly conducted into the zero-gap assembly 20. The sheet workpiece 22 is then fed around the top or upper roller 42 of the zero-gap assembly 20, the top or upper roller 42 of the roller assembly 20 being driven at the same lineal surface velocity as that of the entry bridle rollers 34, 36, 38, and 40. As the sheet workpiece 22 enters the zero-gap assembly 20, it travels around the outer peripheral surface of the top or upper roller 42 until it reaches the nip 46 defined between the top or upper roller 42 and the bottom or lower roller 44. As previously noted, the faster rotating bottom or lower roller 44 pulls the sheet workpiece 22 through the nip 46 while the slower rotating top or upper roller 42, as well as the mill reduction process per se, effectively acts as a brake upon the lower surface of the sheet workpiece 22, that is, the surface of the workpiece 22 which is disposed in contact with the upper or top roller 42. Thus, the sheet workpiece 22 accelerates through the nip 46 defined between the rollers 42 and 44, and is simultaneously milled and stretched to its finalized predetermined thickness dimension as the same passes through the nip 46. The exit bridle assembly 26 subsequently pulls the finished sheet 22 off from the bottom or lower roller 44 of the zero-gap assembly 20, and it is therefore appreciated that in accordance with the method of the present invention, there is able to be achieved the production of a thin, flat, oriented sheet 22 which is ready to be surface treated and/or heat treated as desired, and sliced into thin straps as required or desired for use in strapping packages and the like in accordance with well-known procedures.

It is again reiterated that the above-described apparatus and process produce a significantly better quality strap than those able to be formerly produced in accordance with known or prior art apparatus and processes, as also exemplified and illustrated by means of the various data noted in the following table:

TABLE I

|  | SINGLE DRAW PROCESS | ZERO-GAP PROCESS |
| --- | --- | --- |
| Tensile Strength (KPSI) | 45 | 64 |
| Elongation (%) | 25 | 13 |
| Modulus (at 2 and 5 KPSI | 400 | 963 |
| Weld Strength (Lbs) | 79 | 187 |
| Weld Percent | 55 | 89 |
| Weld Equivalent (KPSI) | 25 | 57 |
| Split (In) | 00.7 | 00.07 |

As can be appreciated from the table noted above, the zero gap method produces strapping which exhibits higher tensile strength, and a stronger and higher percentage weld. Furthermore, splitting of the strapping has been essentially eliminated while still achieving high tensile strength, whereas in accordance with known or prior art manufacturing techniques and processes, as the tensile strength is increased, increased splitting occurs and the percent of weld strength decreases. Still further, since the tensile strength of the strapping produced in accordance with the zero-gap process is approximately 1.47 times the tensile strength of conventionally produced strapping, and since the elongation of such strapping of the present invention is approximately one-half that of the conventional strapping, better creep performance is achieved. Such results present several marketing advantages in connection with polypropylene or polyethylene terephthalate (PET) polyester straps. More particularly, if the break strength of the strapping is a controlling factor in connection with the particular application or use of the strapping, then the higher tensile strength of the material will permit the use or substitution of a strap which comprises only approximately seventy percent (70%) of currently used material or strapping. Similarly, if stiffness is a controlling factor, characteristic, or attribute, the strapping produced in accordance with the present invention is such as to be readily capable of being reliably fed into a strapping machine by being pushed around a guide chute of the strapping machine. Still yet further, if weld strength of the strapping is a controlling factor or characteristic, then strapping comprising less than one-half of the currently or conventionally used raw material will produce the equivalent joint strength.

The various properties resulting from the process of the present invention give significant flexibility of design to the strapping which may then be used in connection with a variety of applications. It is believed, for example, that the strapping produced by means of the process of the present invention exhibits a stronger bond across the grain, while still being relatively easy to tear the strap across the grain. Furthermore, the strap produced by means of the zero-gap process of the present invention does not exhibit structural delamination as is often characteristic of most prior art strapping. Since the strap of the present invention does not exhibit structural delamination, higher weld strength is also obtained. As has also been noted hereinbefore, if a prestretch step is performed between the entry bridle assembly and the zero-gap assembly, or if a post-stretch step is performed between the zero-gap assembly and the exit bridle assembly, the same overall characteristics are achieved as are achieved in accordance with the embodiment of the invention as described in connection with the system and process of FIGS. 1–4. It is noted, however, that if a pre-stretch process step is performed upon the sheet workpiece 22, a higher tensile modulus can be achieved, whereas if a post-stretch process step is performed upon the finished sheeting 22, the material comprising the sheeting has a somewhat greater tendency toward fibrillation.

With reference again being made to the apparatus or system of FIG. 1, it has been discovered that when the sheet workpiece 22 is conducted through the entry bridle assembly 32, and particularly as the workpiece 22 approaches the upper milling and stretching roller 42 of the zero-gap assembly 20, the upper or outer surface of the sheet workpiece 22, that is, the surface thereof which is not disposed in contact with the peripheral surface of the upper or top roller 42 of the zero-gap assembly 20, will tend to cool at a faster rate than the lower or inner surface of the sheet workpiece 22 which is disposed in contact with the peripheral surface of the upper or top roller 42 of the zero-gap assembly 20 in view of the fact that the upper or outer surface of the sheet workpiece 22 is directly exposed to the ambient air. As a result of such uneven or unequal cooling of the workpiece surfaces, or as a result of the development of such a temperature differential between the noted surfaces of the sheet workpiece 22, the sheet workpiece 22 exhibits density differentials throughout the thickness thereof whereby such density differentials adversely affect some of the properties or characteristics of the sheet workpiece. Consequently, in order to rectify, resolve, or eliminate such problem, an improved pre-heating system or apparatus, as more particularly disclosed within the aforenoted pending patent application, Ser. No. 08/353,721, now U.S. Pat. No. 5,525,287, has been developed. In view of the fact that such an improved system or apparatus does not comprise the subject matter of this particular patent application, a detailed description of such system or apparatus is not actually disclosed herein but is hereby incorporated herein by reference.

Continuing further, it is also known that during processing of the sheet workpiece 22, that is, by means of the aforenoted milling and stretching thereof, the side edge portions of the sheet workpiece 22 will tend to be thicker than the more centrally located portions of the sheet workpiece 22. The reasons for this phenomenon are explained within co-pending U.S. patent application Ser. No. 08/474, 355, filed on the same date as the present patent application, and entitled METHOD AND APPARATUS FOR PRODUCING ORIENTED PLASTIC STRAP, AND STRAP PRODUCED THEREBY, and the solution to such problem has been the provision of edge heaters along the side edge portions of the sheet workpiece 22 at positions immediately upstream of the nip 46 defined between the pair of milling rollers 42 and 44. Still further, despite the employment of such edge heaters, it has been additionally determined that concavities and transitional bump regions are nevertheless present within the sheet profile, and in accordance with further teachings of the aforenoted co-pending patent application, Ser. No. 08/474,355, additional strip heaters are also employed in conjunction with the aforenoted edge heaters. Again, in view of the fact that such sheet edge heating apparatus and techniques do not comprise the subject matter of this particular patent application, a detailed description of such apparatus and techniques is omitted herefrom but is hereby incorporated herein by reference. It is still yet further noted that in accordance with the particular teachings of the present invention, additional non-heating, structural apparatus and associated techniques for reducing thickened side edge portions of the fabricated sheeting will be disclosed hereinafter.

Continuing further, while the zero-gap milling and stretching system of FIGS. 1–4 has of course been very satisfactory and commercially successful in connection with the commercial fabrication of polypropylene and polyester sheeting and strapping, particularly as modified by means of the various improvements disclosed within patent application Ser. No. 08/353,721, now U.S. Pat. No. 5,525,287, filed Dec. 12, 1994, and patent application Ser. No. 08/474,355, filed on the same date as the present patent application, additional studies performed in connection with the fabricated sheeting or strapping comprising polyester, particularly polyethylene terephthalate (PET), have demonstrated that the apparatus or system of FIGS. 1–4 in and of itself, and operated in accordance with the previously disclosed method and mode, cannot produce highly-oriented polyester sheets or straps, that is, sheeting or strapping which exhibit, for example, a tensile strength value of 100,000 psi and a modulus value which is within the range of 3,000,000 to 5,000,000 psi. Accordingly, apparatus and a mode of operation, similar to those of FIGS. 1–4 but modified accordingly in accordance with the particular teachings of the present invention, will now be described in connection with the fabrication of such highly-oriented polyester sheets or straps which will exhibit a tensile strength value of 100,000 psi and a modulus value of 3,000,000–5,000,000 psi.

Polyester exists in two different states as a solid, that is, either as amorphous polyester, or crystalline polyester. The present invention is directed toward the fabrication of commercial sheeting or strapping comprising crystalline polyester as derived from amorphous polyester. Amorphous polyester can be changed into crystalline polyester, or crystallized, by means of either heat-induced crystallization or orientation-induced crystallization. Heat-induced crystallization of polyester is disclosed, for example, within U.S. Pat. No. 4,022,863 which issued to Thomas J. Karass et al. on May 10, 1977, however, the fabricated polyester strap is milky-white in appearance and does not exhibit satisfactory split resistance properties. The present invention is therefore directed toward the fabrication of crystalline polyester sheeting by means of orientation-induced crystallization of amorphous polyester employing a modified zero-gap milling and stretching system.

More particularly, with reference now being made to FIGS. 5 and 6, a modified polyester roller assembly or apparatus system is generally indicated by the reference character 100 and is seen to comprise the zero-gap roller assembly 120 comprising upper and lower rollers 142 and 144, an entry bridle arrangement or system 132 comprising rollers 134,136,138, and 140, and an exit bridle arrangement or system 126 which comprises rollers 178, 180,182, and 184. An idler roller 141 is interposed between roller 140 of the entry bridle system 132 and the upper roller 142 of the zero-gap roller assembly 120, and similarly, an idler roller 177 is interposed between the lower roller 144 of the zero-gap roller assembly 120 and the roller 178 of the exit bridle arrangement or system 126.

In order to prevent heat-induced crystallization of the polyester sheet 122 conducted through the entry bridle arrangement 132 and toward the zero-gap milling and stretching assembly 120, until, of course, crystallization has been induced as a result of the orientation of the sheet 122 by means of the sheet 122 having passed through the nip 146 defined between the milling rollers 142 and 144, the temperature of the sheet 122 must be maintained below the glass transition temperature ($T_g$) of approximately 80° C. for any substantial period of time. If the polyester sheet 122 is heated to a temperature level above the glass transition temperature ($T_g$) for any substantial period of time, the sheet 122 will crystallize, become sticky or tacky, and the sheet 122 will not be able to be properly conducted along its conveyance path through the entry bridle assembly 132 and the zero-gap roller assembly 120. Consequently, in accordance with the teachings of the present invention, all of the entry bridle assembly rollers 134, 136, 138, and 140, as well as the idler roller 141 and the upper roller 142 of the zero-gap roller assembly 120 are heated to and maintained at a temperature level of 75° C.

In order to properly process the polyester sheet 122, that is, in order to obtain consistently oriented polyester sheeting which will, in turn, consistently exhibit the desired tensile strength, modulus, creep resistance, split resistance, and other characteristics or parameters, it is necessary to facilitate commencement of the orientation of the sheet workpiece 122 at a precise location along its conveyance path through the system. Since molecular orientation, and therefore crystallization, of the polyester sheeting occurs within the nip 146 defined between the upper and lower rollers 142,144 of the zero-gap assembly 120, the most advantageous location at which the orientation can be commenced and controlled is at a location which immediately precedes the nip 146 defined between the rollers 142,144. From an operational viewpoint, and with reference to FIG. 5, if the end view of the upper roller 142 was considered to the face of a clock, then orientation of the sheet 122 would desirably be commenced within the lower right quadrant of such clock face, or in other words, anywhere within the range from the two o'clock position to the six o'clock position. It might be difficult to achieve such orientation commencement at the six o'clock position since such position comprises the location of the nip 146 defined between the rollers 142,144, so consequently, it is preferred to commence orientation at a position which is effectively as close to the six o'clock position as is possible. Accordingly, in accordance with the present invention, infrared heaters 143 are disposed exteriorly of the upper roller 142 so as to heat the sheet workpiece 122. Such heating changes the tensile strength of the sheet workpiece 122 at such location, elongation of the sheet workpiece 122 becomes easier at such location, and consequently, orientation of the sheet workpiece 122 is controlled or forced to commence at such location. As illustrated in FIGS. 5 and 6, the infrared heaters 143 are disposed at, in effect, a five-thirty (5:30) clockface position, although they may be placed anywhere within the aforenoted range of two o'clock to five-thirty. In addition, the heaters 143 may have a length extending continuously from the two o'clock to five-thirty position so as to extend the heating region of the workpiece 122 depending upon the speed of the workpiece 122 through the assembly 120.

While the infrared heaters 143 will raise the temperature of the workpiece 122 at such location to a temperature value which is greater than the glass transition temperature ($T_g$), due to the closeness of such location to the nip 146 defined between the upper and lower rollers 142 and 144, within which orientation-induced crystallization of the polyester sheet occurs, heat-induced crystallization is minimized. Due to the elevation of the temperature of the sheet workpiece 122 to a temperature level which may be greater than the glass transition temperature ($T_g$), the sheet workpiece 122 may exhibit some tendency to stick to the upper zero-gap roller 142. Consequently, in order to prevent such sticking of the sheet 122 to the upper roller 142, a water-soluble, water-based emulsion, comprising water, air, and 1–2% by weight oil, is applied as a spray, from spraying means 145, onto the lower surface of the sheet workpiece 122 at a conveyance position which is disposed upstream, for example, of the entry bridle idler roller 141. As can be appreciated from FIGS. 5 and 6, the lower surface of the sheet workpiece 122 becomes the inner surface with respect to the upper roller 142 of the zero-gap assembly 120, and consequently, such emulsion will prevent any sticking from occurring between the sheet workpiece 122 and the upper roller 142 of the zero-gap assembly 120. Sticking of the oriented sheet 122 upon the lower roller 144 of the zero-gap assembly 120 is not a problem because once the polyester sheet 122 undergoes its orientation within the nip 146 defined between the rollers 142 and 144 of the zero-gap assembly 120, the amorphous polyester is converted into crystalline polyester which does not exhibit sticky or tacky properties.

In order to properly orient the sheet workpiece 122 within the nip 146 defined between the upper and lower rollers 142 and 144 of the zero-gap assembly 120, the lower zero-gap roller 144 is rotated at a rotational speed such that the lineal surface velocity of such roller 144 is substantially greater than the rotational speed and effective lineal surface velocity of the upper zero-gap roller 142. In particular, in accordance with the present invention, the lineal surface velocity of the lower zero-gap roller 144 is set to be approximately 4–5 times that of the lineal surface velocity of the upper zero-gap roller 142 such that the draw ratio impressed upon the sheet workpiece is likewise within the range of 4–5:1. In a similar manner, the exit bridle assembly rollers 178, 180, 182, and 184 are rotated at a rotational speed which is greater than that of the lower zero-gap roller 144 such that the lineal surface velocity, and therefore, the draw ratio, of the exit bridle assembly rollers 178, 180, 182, and 184 are a multiple of the lineal surface velocity of the lower zero-gap roller 144. In particular, in accordance with the present invention, the lineal surface velocity of the exit bridle rollers 178, 180, 182, and 184 is set to be approximately 1.1–1.5 times that of the lineal surface velocity of the lower zero-gap roller 144 such that the draw ratio impressed upon the sheet workpiece is likewise within the range of 1.1–1.5:1. As can therefore be appreciated, the present invention comprises a two-step drawing process within an overall drawing ratio of approximately 6:1 being impressed upon the sheet workpiece 122. For example, if the lower zero-gap roller 144 is rotated at a rotational speed such that the lineal surface velocity thereof is 4.5 times the lineal surface velocity of the upper zero-gap roller 142, and the exit bridle rollers 178,180,182, and 184 are rotated at a rotational speed such that the lineal surface velocities thereof are 1.34 times the lineal surface velocity of the lower zero-gap roller 144, then an overall or resultant drawing ratio of 6.03 would be achieved and impressed upon the sheet workpiece 122. Alternatively, for example, the lineal surface velocity differential or drawing ratio between the lower zero-gap roller 144 and the upper zero-gap roller 142 could be 5.0 or 5:1, respectively, while the lineal surface velocity differential or drawing ratio defined between the exit bridle assembly rollers 178–184 and the lower zero-gap roller 144 could be 1.2 or 1.2:1, respectively, whereby, again, the overall drawing ratio would be 6:1. In order to facilitate the secondary or second-stage stretching and orientation of the sheet workpiece 122 as developed between the lower zero-gap roller 144 and the exit bridle assembly rollers 178–184, the lower zero-gap roller 144 is heated to a temperature level of 150° C. while the exit bridle assembly rollers 178–184 may be maintained at room temperature ($R_T$). After undergoing the secondary or second-stage stretching and orientation, the resultant polyester sheeting exhibits tensile strength values of 100,000 psi and modulus values of between 3,000,000 psi and 5,000,000 psi.

Figure 7A:
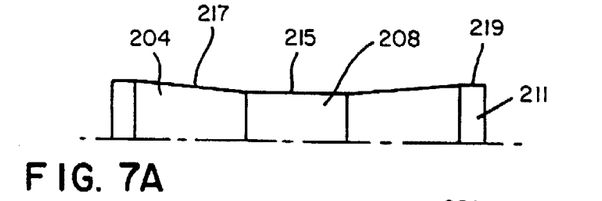
FIGS. 7A and 7B are front views of two different embodiments of milling rollers which can be used within the zero-gap assembly of either FIGS. 5 or 6 so as to produce milled and stretched polyester sheet or strap which has thinner edge portions such that the amount of useable sheeting or strapping exhibiting the desired degree of flatness, as viewed in the transverse direction across the width of the sheeting or strapping, is enhanced.
Figure 7B:
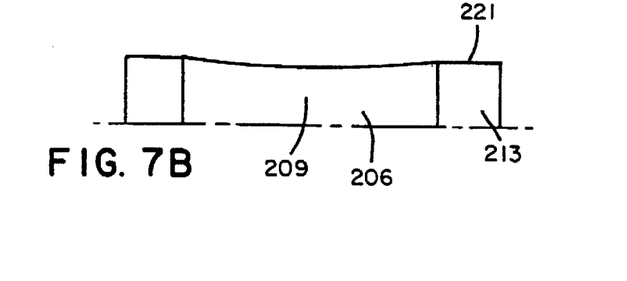

As has been noted hereinbefore, during the fabrication of oriented sheet workpieces within the zero-gap apparatus or system characteristic of the present invention, the fabricated sheet workpieces tend to exhibit thickened edge portions or regions. Accordingly, it has been further noted hereinabove that the provision of suitably disclosed edge heaters and strips heaters, as more fully disclosed within co-pending U.S. patent application Ser. No. 08/474,355, rectifies or substantially eliminates such problem such that an increased volume of useable sheeting or strapping may in fact be produced for the ultimate fabrication of package strapping. Increased flatness or increased amounts of uniformly flat finished sheets across the width dimensions thereof can also be achieved in accordance with other non-heating, structurally based manufacturing techniques. For example, with reference being made to FIGS. 7A and 7B, there is shown, in effect, front view profiles of two differently contoured mill rollers which may be incorporated within the zero-gap assembly 120 of the system of FIGS. 5 and 6 in conjunction with the fabrication of the highly oriented polyester sheeting. As can be appreciated from the contoured mill rollers 204 and 206 of FIGS. 7A and 7B, respectively, the central portions of the rollers 204 and 206 are effectively concave as seen at 208 and 209, respectively, while the lateral side edge portions 211 and 213 have straight or horizontal configurations or contours. In this manner, when the sheet workpiece 122 is milled and stretched within the nip 146, the edge portions of the sheet workpiece 122 will be worked to a greater degree than the central portions of the sheet workpiece 122 whereby the edge portions of the sheet workpiece 122 will be rendered thinner. Upon being processed within the nip 46 or 146, the edge portions of the sheet workpiece 122 will also undergo thickening to some extent as described hereinbefore, whereby the finalized edge regions of the sheet workpiece 122 or finished sheet 122 will have the desired degree of thinness and uniformity of flatness as may be similarly achieved by means of the aforenoted edge and strip heating techniques. As can be further appreciated from FIGS. 7A and 7B, the primary difference between the contours or configurations of the miller rollers 204 and 206 resides in the fact that in the case of the roller 204 of FIG. 7A, the central portion thereof has a cylindrical contour as at 215 while the adjacent axial portions thereof have tapered or frustoconical configurations as at 217. Finally, the outermost end or edge portions are cylindrical as at 219, the diametrical extent of cylindrical portions 219 being, however, greater than the diametrical extent of central cylindrical portion 215. Similarly, in the case of the roller 206 of FIG. 7B, the central portion 209 has a concave arcuate configuration while the outermost end portions 221 are cylindrical and have diametrical extents which are greater than that of the central portion 209.

Figures 8A, 8B:
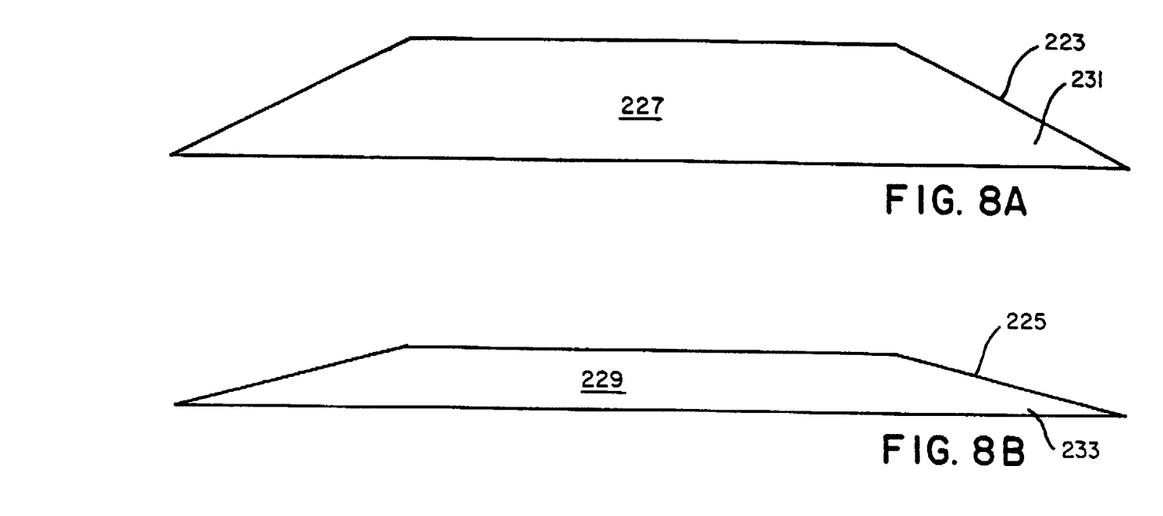
FIGS. 8A and 8B are diagrammatic cross-sectional views of extrusion dies which can be used to produce a sheet workpiece having thinner edge portions such that the amount of useable sheeting or strapping exhibiting the desired degree of flatness, as viewed in the transverse direction across the width of the sheeting or strapping, when the sheeting or strapping is milled and stretched, is enhanced.
Figure 9:
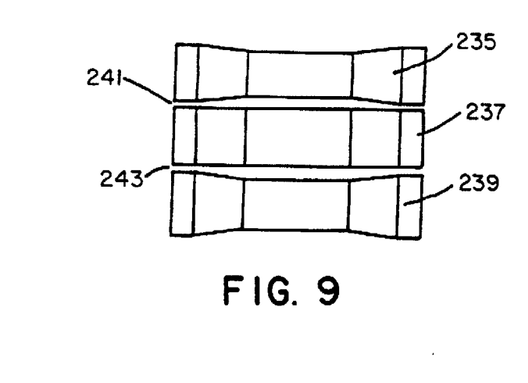
FIG. 9 is a front view of casting rolls used in conjunction with the extrusion dies of FIGS. 8A and 8B for casting and further forming the sheet workpiece extruded from the extrusion dies of FIGS. 8A and 8B such that the sheet workpiece can be conducted downstream toward the zero-gap milling and stretching assembly.

With reference lastly being made to FIGS. 8A, 8B, and 9, another manufacturing technique which may be employed in order to achieve increased flatness or increased amounts of uniformly flat finished sheets across the width dimensions thereof involves the extrusion of the sheet workpiece 122 from particularly configured extrusion dies 223 and 225 which are respectively shown in FIGS. 8A and 8B. As can be appreciated from such figures, each one of the dies 223 and 225 has, in effect, a die mouth 227 and 229 which has a trapezoidal configuration which therefore produces polyester sheet workpieces 122 which likewise have trapezoidal cross-sectional configurations, or in other words, the edge portions 231 and 233 will be substantially thinner than the central portions of the sheet workpieces 122. In this manner, when such trapezoidal configured sheet workpieces 122 are milled and stretched, their edge portions will have thickness dimensions which are substantially the same as that of the central portion of the sheet workpiece 122 such that a substantially uniform thickness dimension is achieved across substantially the entire width of the sheet workpiece 122, except, of course, at the very outermost edge regions as has been noted hereinbefore. It is further appreciated that the only significant difference between the dies 223 and 225 is that die 223 produces a sheet workpiece 122 which has a greater thickness dimension than a similar workpiece 122 that may be produced by means of die 225.

In FIG. 9, a set of casting rollers 235, 237, and 239 are disclosed as being arranged in a vertical array. The upper and lower rollers 235 and 239 each have configurations which are somewhat similar to those of mill rollers 204 and 206, while the central casting roller 237 has a cylindrical configuration. Consequently, it can be appreciated that the spaces 241 and 243 defined respectively between the casting rollers 235 and 237, and 237 and 239, have, in effect, trapezoidal configurations such that when the sheet workpiece 122 is extruded from the die mouths 227 or 229, the workpiece 122 is initially routed about the casting rollers so as to be inserted into the space 241, wrapped around the roller 237, and withdrawn from the space 243. Consequently, it is seen that the trapezoidal configuration of space 243 is, in effect, upside-down with respect to the trapezoidal configuration of space 241. As an alternative means of creating or defining the trapezoidal spaces 241 and 243, rollers 235 and 239 may be cylindrical while roller 237 has a configuration similar to that of roller 204 or 206. After passing through such spaces 241 and 243, the sheet workpiece 122 may be conveyed further toward the zero-gap assembly 120 for processing in accordance with the techniques of the present invention as previously described.

Thus, it may be seen that in accordance with the foregoing, and particularly the manufacturing techniques and apparatus developed in accordance with the principles of the present invention, finished milled and stretched sheet comprising highly-oriented polyester exhibit enhanced tensile strength and modulus characteristics. In addition, the sheets also exhibit improved degrees or uniformity of flatness whereby increased volumes of polyester strapping may be produced or derived therefrom.

Obviously, many modifications and variations of the present invention are possible in light of the above teachings. It is therefore to be understood that within the scope of the appended claims, the present invention may be practiced otherwise than as specifically described and set forth herein.

What is claimed as new and desired to be secured by letters patent of the United States of America, is:

1. Apparatus for producing highly-oriented polyester sheeting, comprising:

a pair of opposed rollers defining a nip therebetween through which a solid sheet workpiece of polyester is passed so as to be simultaneously milled and stretched as said sheet workpiece passes through said nip in a single pass and in a predetermined direction of travel;

means for driving said pair of opposed rollers in opposite directions and at sufficiently different lineal surface velocities for simultaneously milling and stretching said sheet workpiece within said nip defined between said pair of opposed rollers in accordance with a predetermined first draw ratio defined between said pair of opposed rollers by said different lineal surface velocities of said pair of opposed rollers;

at least one additional roller disposed downstream from a downstream one of said pair of opposed rollers as viewed along said predetermined direction of travel for withdrawing said milled and stretched sheet workpiece away from said pair of opposed rollers; and means for driving said at least one additional roller at a sufficiently different lineal surface velocity with respect to said lineal surface velocity of said downstream one of said pair of opposed rollers so as to additionally stretch said milled and stretched sheet workpiece in accordance with a predetermined second draw ratio.

2. The apparatus as set forth in claim 1, wherein:

said polyester sheet workpieces comprises polyethylene terephthalate.

3. The apparatus as set forth in claim 1, wherein:

said at least one additional roller comprises a set of rollers forming an exit bridle assembly for said milled and stretched workpiece with respect to said pair of opposed rollers.

4. The apparatus as set forth in claim 1, wherein:

said means for driving said pair of opposed rollers drive said pair of opposed rollers such that said predetermined first draw ratio defined between said pair of opposed rollers is within the range of 4–5:1; and said means for driving said at least one additional roller drives said at least one additional roller such that said predetermined second draw ratio defined between said at least one additional roller and said downstream one of said pair of opposed rollers is within the range of 1.1–1.5:1, whereby the overall draw ratio impressed upon said polyester sheet workpiece is approximately 6:1, and said highly-oriented polyester sheeting exhibits tensile strength values of approximately 100,000 psi and modulus values within the range of approximately 3,000,000–5,000,000 psi.

5. The apparatus as set forth in claim 1, further comprising:

said polyester sheet workpiece comprises amorphous polyester prior to passage of said sheet workpiece through said nip defined between said pair of opposed rollers, whereupon passage of said sheet workpiece through said nip defined between said pair of opposed rollers said sheet workpiece undergoes orientation-induced crystallization so as to comprise crystalline polyester;

means for heating an upstream one of said pair of rollers so as to in turn preheat said sheet workpiece to a temperature level which is below the glass transition temperature ($T_g$) of said sheet workpiece so as to prevent sticking of said amorphous polyester sheet workpiece to said upstream one of said pair of rollers; and means for heating said downstream one of said pair of rollers to a temperature level which is substantially above said glass transition temperature ($T_g$) of said sheet workpiece so as to facilitate said additional stretching of said crystalline polyester sheet workpiece.

6. The apparatus as set forth in claim 5, further comprising:

means for heating said sheet workpiece, at a location immediately upstream of said nip defined between said pair of opposed rollers, to a temperature level which is greater than said glass transition temperature ($T_g$) of said polyester sheet so as to predetermine control of said orientation of said polyester sheet by said milling and stretching of said polyester sheet within said nip defined between said pair of opposed rollers; and means for supplying a lubricant to a surface of said polyester sheet at a position upstream of said nip defined between said pair of opposed rollers so as to prevent any sticking of said polyester sheet to said upstream one of said pair of opposed rollers when said polyester sheet workpiece is heated to said temperature level greater than said glass transition temperature ($T_g$).

7. The apparatus as set forth in claim 1, wherein:

said pair of opposed rollers each has a configuration comprising a concave central portion and cylindrical end portions so as to provide said sheet workpiece with thinner edge portions than said central portion when said sheet workpiece is conducted through said nip defined between said pair of opposed rollers such that an increased degree of flatness of said simultaneously milled and stretched sheet workpiece, across the width of said simultaneously milled and stretched sheet workpiece after said simultaneously milled and stretched sheet workpiece has passed through said nip defined between said pair of opposed rollers, is achieved.

8. The apparatus as set forth in claim 7, wherein:

said central portions of said pair of opposed rollers are arcuate in configuration.

9. The apparatus as set forth in claim 7, wherein:

said central portions of said pair of opposed rollers have a trapezoidal configuration.

10. The apparatus as set forth in claim 1, further comprising:

die means for extruding said sheet workpiece wherein said die means has a predetermined cross-sectional configuration such that said extruded sheet workpiece has thinner edge portions than central portions such that an increased degree of flatness of said simultaneously milled and stretched sheet workpiece, across the width of said simultaneously milled and stretched sheet workpiece after said simultaneously milled and stretched sheet workpiece has passed through said nip defined between said pair of opposed rollers, is achieved.

11. The apparatus as set forth in claim 10, wherein:

said predetermined cross-sectional configuration of said die means comprises a trapezoid.

12. The apparatus as set forth in claim 11, further comprising:

a plurality of casting rolls disposed within a vertical array and defining spaces therebetween which have a trapezoidal configuration for accommodating trapezoidal-configured sheet workpieces produced by said die means.

13. A method for producing highly-oriented polyester sheeting, comprising the steps of:

providing a pair of opposed rollers defining a nip therebetween through which a solid sheet workpiece of polyester is passed so as to be simultaneously milled and stretched as said sheet workpiece passes through said nip in a single pass and in a predetermined direction of travel;

driving said pair of opposed rollers in opposite directions and at sufficiently different lineal surface velocities for simultaneously milling and stretching said sheet workpiece within said nip defined between said pair of opposed rollers in accordance with a predetermined first draw ratio defined between said pair of opposed rollers by said different lineal surface velocities of said pair of opposed rollers;

providing at least one additional roller downstream from a downstream one of said pair of opposed rollers, as viewed along said predetermined direction of travel, for withdrawing said milled and stretched sheet workpiece away from said pair of opposed rollers; and driving said at least one additional roller at a sufficiently different lineal surface velocity with respect to said lineal surface velocity of said downstream one of said pair of opposed rollers so as to additionally stretch said milled and stretched sheet workpiece in accordance with a predetermined second draw ratio.

14. The method as set forth in claim 13, wherein:

said polyester sheet workpiece is fabricated from polyethylene terephthalate.

15. The method as set forth in claim 13, wherein:

said at least one additional roller comprises a set of rollers defining an exit bridle assembly for said milled and stretched workpiece with respect to said pair of opposed rollers; and all of said rollers of said set of rollers defining said exit bridle assembly are driven at a rotational speed so as to define with said downstream one of said pair of opposed rollers said second draw ratio.

16. The method as set forth in claim 13, wherein:

said first draw ratio is within the range of 4–5:1; and said second draw ratio is within the range of 1.1–1.5:1, whereby the overall draw ratio impressed upon said polyester sheet workpiece is approximately 6:1, and said highly-oriented polyester sheeting exhibits tensile strength values of approximately 100,000 psi and modulus values within the range of approximately 3,000,000–5,000,000 psi.

17. The method as set forth in claim 13, further comprising the steps of:

said polyester sheet workpiece comprises amorphous polyester prior to passage of said sheet workpiece through said nip defined between said pair of opposed rollers, whereupon passage of said sheet workpiece through said nip defined between said pair of opposed rollers, said sheet workpiece undergoes orientation-induced crystallization so as to comprise crystalline polyester;

heating an upstream one of said pair of rollers so as to in turn preheat said sheet workpiece to a temperature level which is below the glass transition temperature ($T_g$) of said sheet workpiece so as to prevent sticking of said amorphous polyester sheet workpiece to said upstream one of said pair of rollers; and heating said downstream one of said pair of rollers to a temperature level which is substantially above said glass transition temperature ($T_g$) of said sheet workpiece so as to facilitate said additional stretching of said crystalline polyester sheet workpiece.

18. The method as set forth in claim 17, further comprising the steps of:

heating said sheet workpiece, at a location immediately upstream of said nip defined between said pair of opposed rollers, to a temperature level which is greater than said glass transition temperature ($T_g$) of said polyester sheet so as to predetermine control of said orientation of said polyester sheet by said milling and stretching of said polyester sheet within said nip defined between said pair of opposed rollers; and supplying a lubricant to a surface of said polyester sheet which will be disposed in contact with said upstream one of said pair of opposed rollers and at a position upstream of said nip defined between said pair of opposed rollers so as to prevent any sticking of said polyester sheet to said upstream one of said pair of opposed rollers when said polyester sheet workpiece is heated to said temperature level which is greater than said glass transition temperature ($T_g$).

19. The method as set forth in claim 13, further comprising the step of:

providing said pair of opposed rollers with a configuration which comprises a concave central portion and cylindrical end portions so as to provide said sheet workpiece with thinner edge portions than said central portion when said sheet workpiece is conducted through said nip defined between said pair of opposed rollers such that an increased degree of flatness of said simultaneously milled and stretched sheet workpiece, across the width of said simultaneously milled and stretched sheet workpiece after said simultaneously milled and stretched workpiece has passed through said nip defined between said pair of opposed rollers, is achieved.

20. The method as set forth in claim 13, further comprising the step of:

providing die means for extruding said sheet workpiece wherein said die means has a predetermined cross-sectional configuration such that said extruded sheet workpiece has thinner edge portions than central portions such that an increased degree of flatness of said simultaneously milled and stretched sheet workpiece, across the width of said simultaneously milled and stretched sheet workpiece after said simultaneously milled and stretched sheet workpiece has passed through said nip defined between said pair of opposed rollers, is achieved.

21. The method as set forth in claim 20, wherein:

said predetermined cross-sectional configuration of said die means comprises a trapezoid.

22. The method as set forth in claim 21, further comprising the step of:

providing a plurality of casting rolls disposed within a vertical array and defining spaces therebetween which have a trapezoidal configuration for accommodating trapezoidal-configured sheet workpieces produced by said die means.

* * * * *